United States Patent [19]

Johnson

[11] Patent Number: 5,746,284

[45] Date of Patent: May 5, 1998

[54] VEHICLE BACK-UP SAFETY DEVICE

[76] Inventor: David Johnson, Rte. 1, Box 788-B, Hortense, Ga. 31543

[21] Appl. No.: 632,358

[22] Filed: Apr. 10, 1996

[51] Int. Cl.⁶ ........................................................ B60T 7/16
[52] U.S. Cl. .......................... 180/167; 180/275; 303/191; 60/545
[58] Field of Search ........................ 180/167, 169, 180/271, 274, 275; 303/191, 193; 60/545, 591; 188/353

[56] References Cited

U.S. PATENT DOCUMENTS

| | | | |
|---|---|---|---|
| 2,588,815 | 3/1952 | Fasolino | 180/275 |
| 3,972,382 | 8/1976 | Takayama et al. | 303/193 X |
| 4,407,388 | 10/1983 | Steel | 180/275 X |
| 4,574,908 | 3/1986 | Brick | 180/169 |
| 4,591,019 | 5/1986 | Fisher et al. | 180/275 |
| 4,799,570 | 1/1989 | Andersson et al. | 180/275 |

*Primary Examiner*—Robert J. Oberleitner
*Assistant Examiner*—Pamela Lipka
*Attorney, Agent, or Firm*—Peter A. Borsari; Eric W. Trucksess

[57] ABSTRACT

A vehicle back-up safety device comprising a sensing system for detecting the presence of an obstruction within a prescribed area behind the vehicle while a user is driving in reverse. In response to a signal from the sensing system signifying the presence of a an obstruction, a control means activates a pair of electrically-motivated plunger assemblies to force fluid into the vehicle's brake line system, thereby activating the vehicle's brakes.

19 Claims, 4 Drawing Sheets

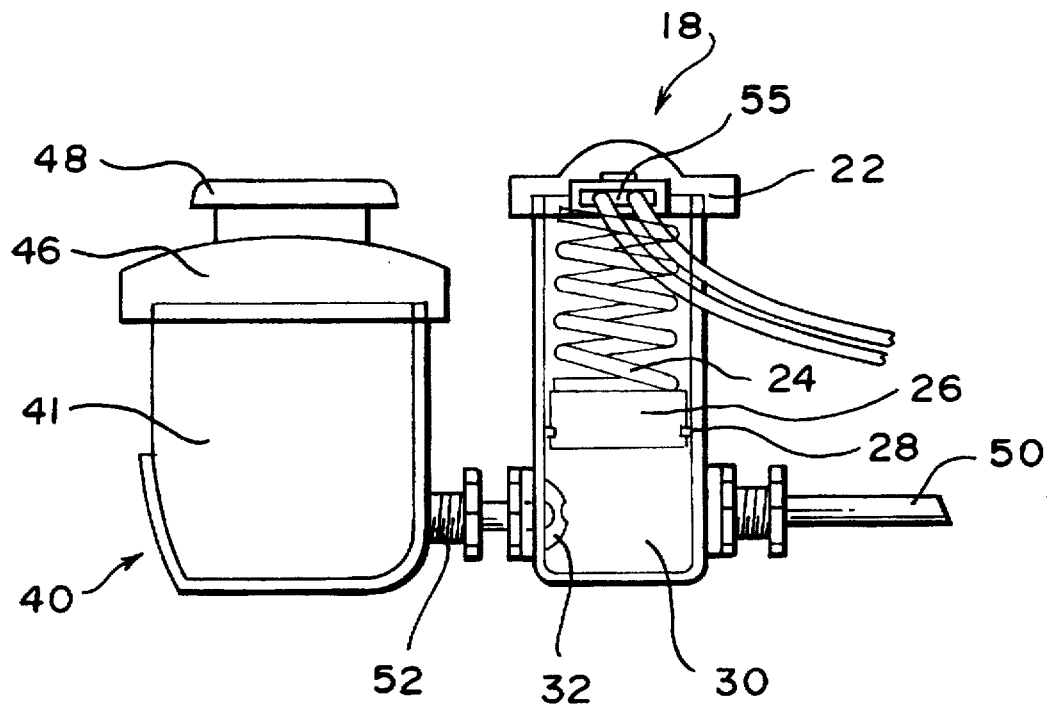
FIG. 4
FIG. 5
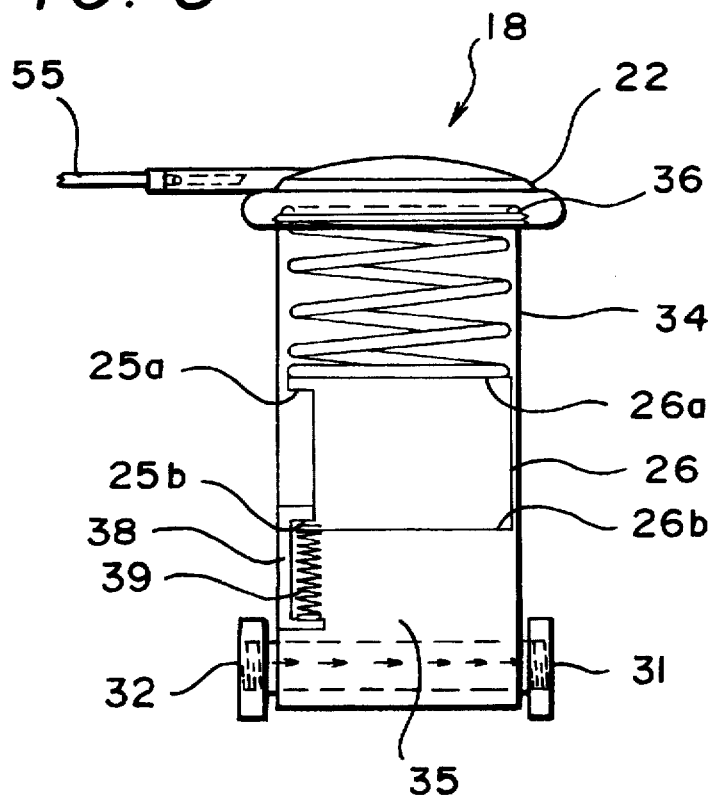

VEHICLE BACK-UP SAFETY DEVICE

FIELD OF INVENTION

The invention generally relates to vehicle back-up safety devices and more particularly relates to a vehicle back-up safety device having means for detecting the presence of an obstruction within close proximity to the vehicle and means for retarding or stopping the potentially dangerous movement of a motorized vehicle having a hydraulic braking system.

BACKGROUND OF THE INVENTION

As suburbia continues to grow and as land is subdivided into ever-smaller plots to accommodate new houses, apartment complexes and townhouses, population density rises inexorably creating a high vehicle density while failing to maintain road safety. Additionally, this traffic on our roads and in our neighborhoods subjects the vehicle driver, pedestrian, property, and especially children to the inherent risks automobiles pose.

A driver has great but limited control over his vehicle with respect to objects he can observe in front of his vehicle. However, a driver's field of view is obstructed in the area located behind his vehicle, making it difficult to see objects located or moving in this area as well as objects moving into this area while he is driving. The difficulty may be compounded when a driver is situated in a truck having a high rear section, for example, a delivery truck, garbage truck and the like. Moreover, because the driver's natural driving position faces toward the front of the vehicle, a distracted or inexperienced driver may fail to monitor this area adequately especially while driving in reverse. Small children, unaware pedestrians, animals and other drivers may be located and moving within this area in close proximity to the moving vehicle and may be unaware of the potential danger the vehicle poses. A driver's failure to stop his vehicle may result in fatal consequences.

Accordingly, many attempts have been made to warn a driver and/or to assist a driver in avoiding collisions with obstructions by providing means to sense the proximity of objects to the vehicle, to determine the imminence of contact and either to notify the driver by signalling means or to retard the movement of the vehicle automatically.

For example, the braking system taught by U.S. Pat. No. 4,574,908, issued Mar. 11, 1986 to Francis M. Brick utilizes an ultrasound sensing means to detect the proximity of objects to the user's vehicle. Brick's system scans to the rear of the vehicle only when the vehicle is in reverse. When an object is detected, the system utilizes a dual pressure accumulator to drive braking fluid into the vehicle's brake line. The dual pressure accumulator is assisted by compressed air which is injected into a central portion of the accumulator, as well as by power steering fluid which is pumped into a forward portion of the accumulator. Both the power steering fluid and the compressed air exert pressure on a pair of spring-biased pistons. In the event of a need to brake the vehicle, the power steering fluid and compressed air drive the pistons toward the rear of the accumulator, thereby driving the braking fluid out of the brake lines. Brick's apparatus requires the use of a vehicle having power steering fluid.

U.S. Pat. No. 4,864,298, issued Sep. 5, 1989 to Anthony E. Dombrowski discloses a driver alerting device which provides an audible alarm when a target is located within a prescribed area behind the vehicle. The device, operable when the vehicle transmission is engaged in reverse gear, uses a solenoid which is operatively connected to the air brakes of the vehicle and automatically applies the vehicle's brakes simultaneously with the audible signal. Other systems providing only audible alarm systems are illustrated in U.S. Pat. No. 4,797,673, issued Jan. 10, 1989 and U.S. Pat. No. 4,803,488, issued Feb. 7, 1989, both to Anthony E. Dombrowski.

Another automatic braking apparatus using ultrasound generating and transmitting means is shown in U.S. Pat. No. 5,170,858, issued Dec. 15, 1992 to Guo-Juh Chen. The apparatus further comprises an ultrasound receiver, a driving motor means and a brake master cylinder. The sensing ultrasound system is used to determine the proximity of user's vehicle to another vehicle or object located in front of the user's vehicle. In the event that the user's vehicle is too close to sensed objects, an automatic braking means consisting of the motor means and the brake master cylinder engage the user's vehicle's braking system, forcing brake fluid into the brake lines. The brake master cylinder of Chen's automatic braking means is a secondary master cylinder which is inserted in parallel fashion to the vehicle's manual brake master cylinder.

U.S. Pat. No. 4,964,485, issued Oct. 23, 1990 to Jonathan R. Miele describes a device which senses impacts between a vehicle and objects located behind the vehicle when the vehicle is backing-up and automatically applies the brakes of a hydraulic brake system. Although designed for use on a vehicle having a hydraulic braking system, the device requires modifying the braking system by installing into the vehicle an air compressor and an air compressor-driven pneumatic cylinder. When an impact is sensed, the pneumatic cylinder is used to pull on the brake pedal to retard the vehicle's movement.

U.S. Pat. No. 4,407,338, issued Oct. 4, 1983 to James Steel discloses another collision prevention system that uses pneumatic means to stop a heavy vehicle when a moving object creates a hazard behind the vehicle moving in reverse.

The back up warning switch means for vehicles shown in U.S. Pat. No. 3,409,874, issued Apr. 11, 1966 to Robert P. Bowler sounds an audible alarm when the vehicle is in reverse only upon actual contact by a sensor with an object. Bowler estimates that six to ten inches stopping distance is sufficient for a vehicle moving in reverse at a slow speed.

The obstacle detection system for a vehicle shown in U.S. Pat. No. 5,235,315, issued Aug. 10, 1993 to James R. Cherry et al. provides a self test of the ground and signals the presence of significant objects in the vehicle's path by an audible alarm. Neither this system nor that described in U.S. Pat. No. 4,626,850, issued Dec. 2, 1986 to Young H. Chey are designed specifically to stop a vehicle which is in reverse gear when a moving object is detected to the rear of the vehicle.

An auxiliary air brake system responsive to a detector member is provided in U.S. Pat. No. 4,591,019, issued May 27, 1986 to Brian Fisher et al. The auxiliary system is used in lieu of the existing braking system of a motor vehicle.

U.S. Pat. No. 5,278,764, issued Jan. 11, 1994 to Haruhiko Iizuka et al. shows a system for monitoring and controlling the distance at which a vehicle follows another vehicle when the vehicle is moving forward.

Despite the teachings of the prior art, a need still exists for an easily mountable back-up safety device for stopping a vehicle having a hydraulic braking system when the vehicle is backing up. Such a device should apply the vehicle's brakes in response to a sensing means which has detected the presence of an obstruction within a specified range to the rear of the vehicle and which threatens imminent contact with the moving vehicle.

SUMMARY OF THE INVENTION

Accordingly, it is an object of the present invention to provide a vehicle back-up safety device for stopping a vehicle which is backing up when the presence of an obstruction is detected within a specified range of the rear of the vehicle.

It is another object of the present invention to provide a vehicle back-up safety device which brakes the vehicle by utilizing the hydraulic braking system already present in most vehicles.

It is a further object of the present invention to provide a vehicle back-up safety device which employs an electrically generated signal for detecting the presence of an obstruction behind said vehicle.

It is a still further object of the present invention to provide a vehicle back-up safety device which may be easily mounted to a vehicle.

It is an additional object of the present invention to provide a vehicle back-up safety device which is economical to manufacture, simple and durable in construction and effective in operation.

Additional objects, advantages and novel features of the invention will be set forth in part of the description which follows, and in part will become apparent to those skilled in the art upon examination of the following specification or may be learned by practice of the invention.

BRIEF DESCRIPTION OF THE DRAWINGS

The present invention will be better understood with reference to the appended drawing sheets, wherein:

FIG. 4 is a cross sectional view of the present invention taken along lines 4—4 in FIG. 3.

FIG. 5 is a cross sectional view of an electrically-motivated plunger assembly of the present invention showing in broken line the movement of braking fluid through the plunger.

DETAILED DESCRIPTION

The present invention relates to a vehicle back-up safety device comprising a sensing system for detecting the presence of an obstruction to the rear of the vehicle while a user is driving in reverse and a braking system for stopping the vehicle. More specifically, upon the detection of an object behind the vehicle, a sensing means generates an activating signal which triggers a control means to switch an electronic gate, thereby supplying electrical power to a pair of electrically-motivated plungers and forcing the plungers into the vehicle's brake master cylinder to effect a braking of the vehicle.

Figure 2:
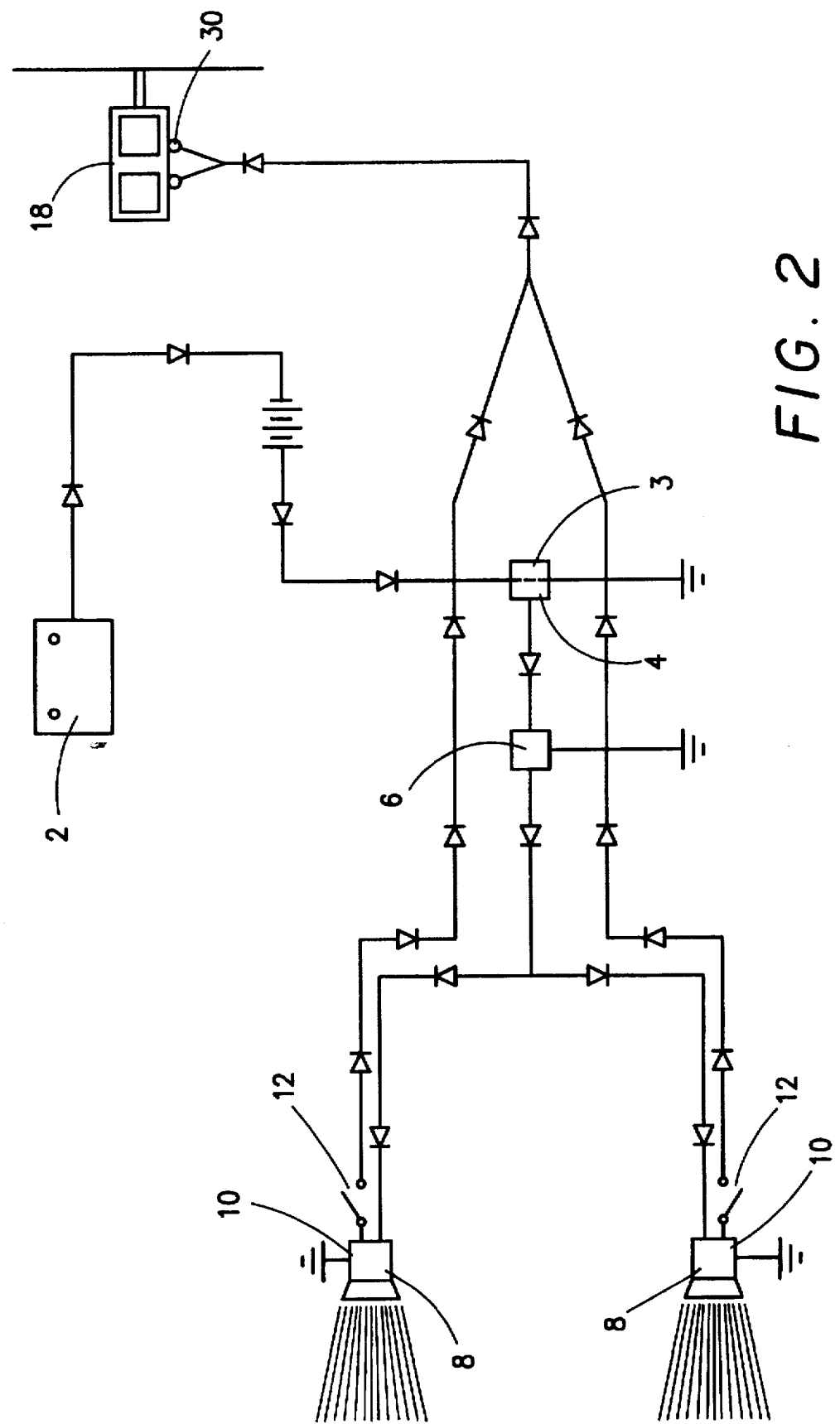
FIG. 2 is a schematic diagram of the back-up safety device of the present invention.

In the schematic diagram shown in FIG. 2, the back-up safety device comprises two systems, a sensing system in which a sensing device operates to monitor a region behind the vehicle for obstructions and a braking system in which electrically motivated plungers operate to effect braking of the vehicle. A control means mediates between the two systems through an electronic switch in order to provide the braking system with electrical power in response to appropriate indicia from the sensing system.

Still referring to the schematic diagram shown in FIG. 2, the sensing system comprises an electric sensing device 8 connected to an electrical power source 2 through an electronic switch 4, such as a solenoid, a transistor or the like, wired in parallel with a switch 3. Switch 3 is the standard reverse switch found in the vehicle's transmission 5 which activates the vehicle's back-up lights. The wiring of the sensing device 8 in parallel with switch 3 ensures that the sensing device is automatically engaged whenever the vehicle is in reverse. In this manner, power is supplied to sensing device 8 only when the vehicle is in reverse gear. In a simplified alternative embodiment, the switch 4 may be omitted and the sensing device 8 simply may be connected in parallel with the reverse switch 3. Electrical power source 2 may be derived directly from the vehicle's electrical system, for example by patching into the vehicle's wiring harness, or may be derived from a separate battery, such as a twelve volt battery.

The sensing device 8 may be any of a number of conventional sensing devices well known in the prior art, including for example, infrared, laser or ultrasonic sensing devices. Regardless of the chosen sensing mode, the sensing means is characterized in having a transmitter for generating and transmitting an object detection signal and a receiver for receiving a reflection of the object detection signal off of an obstruction. The range of the object detection signal may be determined by the manufacturer's method of construction. Alternatively, the sensing means may be constructed to allow the user to pre-select a specified range. Preferably, the range should be at least twenty-two feet, the distance the vehicle will travel in one second at fifteen miles per hour. However, the prescribed range may be extended to provide a larger monitored region.

Figure 1:
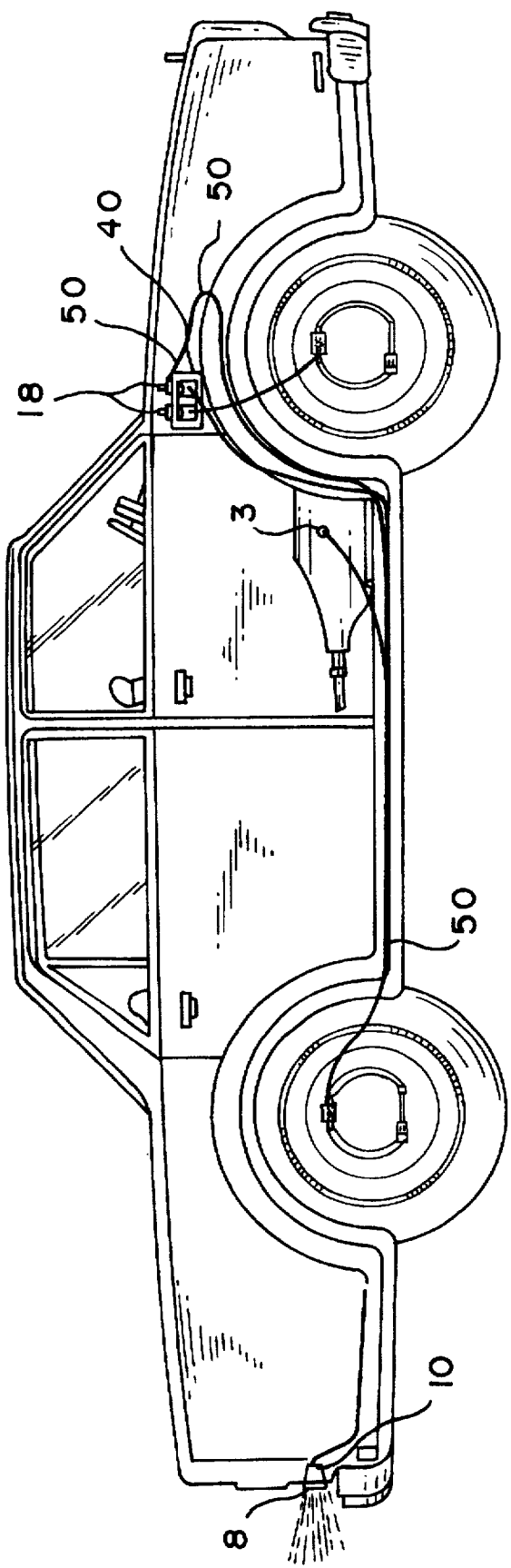
FIG. 1 is a environmental view of the vehicle back-up safety device installed in an automobile.

The receiver may be highly directional, as required by the sensing mode, and generates and transmits an activating signal to a control means 10 in response to receiving a reflected object detection signal. Means also may be provided to amplify the reflected signal. An example of such an amplifying circuit is schematically shown in U.S. Pat. No. 5,170,858 to Chen, numbered "22" in FIG. 1 thereof, and is expressly incorporated by herein by reference. Notwithstanding this express incorporation, other operational amplifier arrangements may be used to provide an efficient signal amplification means as is required by the chosen sensing means.

Figure 3:
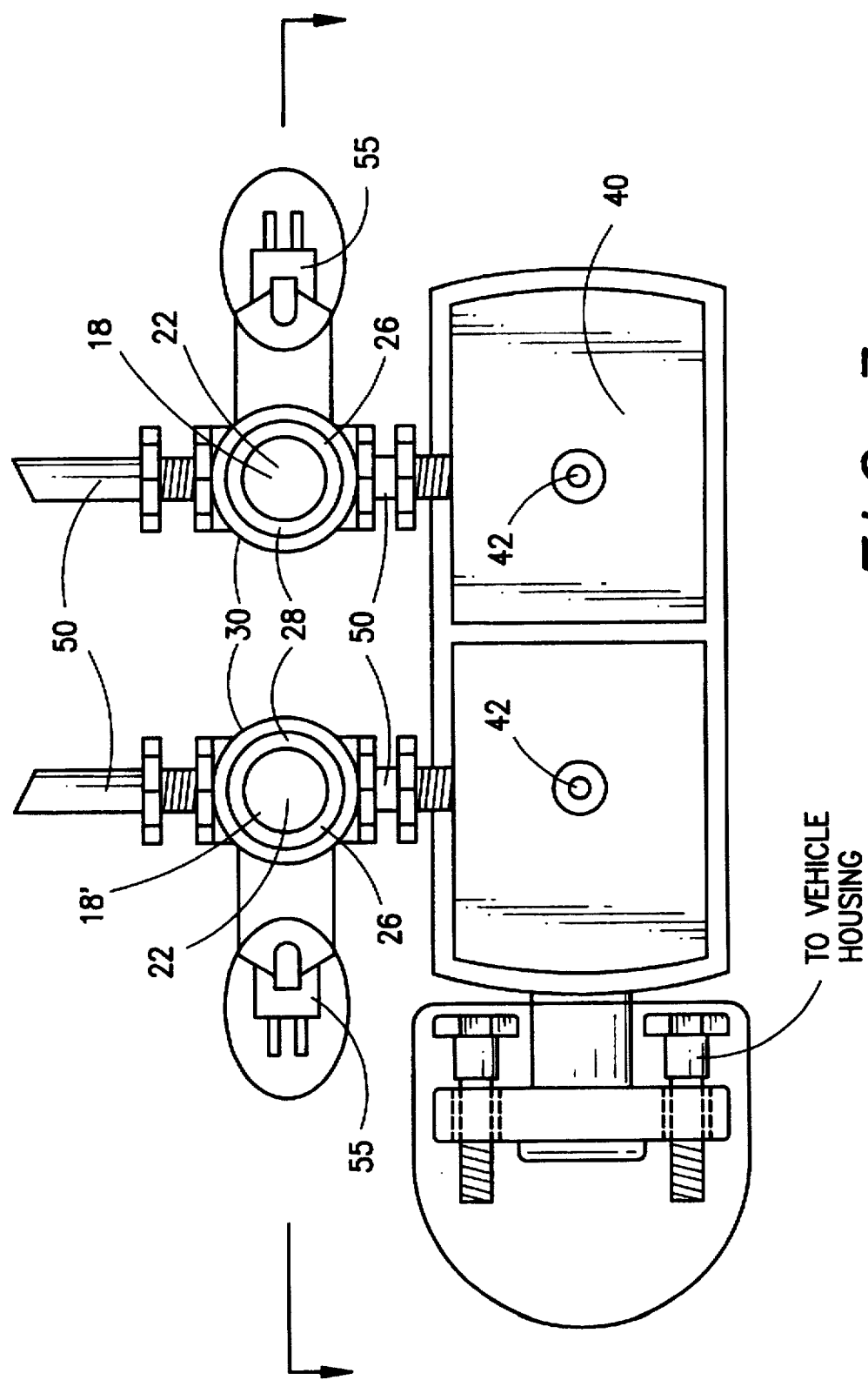
FIG. 3 is an environmental top perspective view showing the relative placement of the electrically-motivated plunger assemblies of the present invention between a vehicle's brake master cylinder and brake lines.

Referring now to FIGS. 3 and 4, the braking system preferably comprises two electrically-motivated plunger assemblies 18, 18' situated in fluid communication with a brake master cylinder 40 and brake lines 50. The brake master cylinder 40 is a standard master cylinder used in conjunction with a most conventional hydraulic braking systems and comprises a body 41 having a cylinder cap 46 and a top filler cap 48. Master cylinder ball valves 42 control the conduction of braking fluid from the brake master cylinder 40 via outlets 52 into brake lines 50 leading to the vehicle's brakes. The plunger assemblies 18, 18' are fixedly connected between master cylinder 40 and brake lines 50 by threaded engagement to the outlets 52 and brake lines.

Cross sectional views of a single plunger assembly, hereinafter denoted "18" are shown in FIGS. 4 and 5. An identically configured plunger assembly 18' as shown in FIG. 2 is specifically implied in the following description of plunger assembly 18. Plunger assembly 18 comprises a plunger 26 having an upper end 26a attached to an extensible plunger spring 24 having a lower end 26b, a plunger solenoid 30 having an electrical connection 55 to power source 2, a hollow solenoid housing 34, a solenoid plunger cap 22 and a slide gate shutoff 38 having a squared "C"-shaped cross section having a compressible slide gate spring 39 disposed therein. Plunger 26 is configured with an upper flange 25a at its upper end and a lower flange 25b at its lower end, said lower flange extending into said slide gate shutoff and contacting the proximal end of the compressible spring 39. At the lower end 35 of the solenoid housing 34, a fluid inlet 32 provides fluid communication between the master cylinder 40 and the plunger assembly 18. Similarly, a fluid outlet 31 serves as a fluid path from the plunger assembly 18 into the brake lines 50. In use, the lower end 35 of the solenoid housing 34 fills with braking fluid from the master cylinder 40. An O-ring 36 within the solenoid plunger cap 22 and another O-ring surrounding the plunger 26, provide liquid seals to prevent braking fluid from escaping the plunger assembly 18 by any path other than the fluid inlet 32 and the fluid outlet 31.

Control means 10 preferably is connected to the power source 2 through the sensing device 8. When the control means 10 receives an activating signal from the sensing device's receiver, the control means closes a second electronic switch 12 in order to provide the plunger assembly 18 with electrical power from the power source 2. Activation of the plunger assembly motivates the plunger 26 downwardly whereby said lower flange 25b exerts a pressure on said compressible spring 39 thereby motivating said slide gate shutoff 38 downward, in order to obstruct the fluid inlet 32. The continued downward path of plunger 26 forces brake line fluid into brake lines 50, thereby activating the vehicle's braking system and stopping the vehicle's movement.

In operation, the safety back-up device of the present invention functions in the following manner. When the user engages his vehicle in reverse gear, switch 4 is closed, thereby supplying electrical power from power source 2 to electric sensing means 8. The sensing device's transmitter generates and transmits an object detection signal to a prescribed area behind the vehicle. Preferably, the transmitting signal is an infrared signal although as discussed above, any conventional sensing device may be utilized in the present invention. An obstruction located within the prescribed range of the signal will partially reflect the object detection signal to the sensing device's receiver. The receiver generates an activation signal which is subject to amplification and which is received by control means 10.

In response to the amplified activation signal, said control means 10 closes second electronic switch 12 thereby supplying electric power to each plunger assembly 18, 18'. Once each plunger solenoid 30 is activated, the plunger assembly motivates plunger 26 downwardly. As a consequence of this downward movement, the plunger applies a pressure to the braking fluid in the lower end 35 of the solenoid housing 34 and causes the slide gate shutoff 38 to block the fluid inlet 32. As the plunger continues its downward movement, slide gate spring 39 is compressed and braking fluid is forced into the brake lines 50 of the vehicle, thereby retarding and stopping the vehicle.

The back-up safety device of the present invention optionally may be provided with an override mechanism 6. Such an override mechanism may be in the form of a button, physical switch or similar device located within the vehicle and easily accessible to the driver. The override mechanism may be configured to enable an electrical switch to be opened at any point within the circuit joining the power source to the solenoids, thereby breaking the circuit and disabling power to the plunger solenoids 36. Use of the override mechanism may be required when a user desires to back his vehicle toward a perceived obstruction which is located within the prescribed range of the sensing means. The solenoids 36 also are disabled when the vehicle is no longer in reverse or when the sensing device 8 no longer detects an obstruction.

When disabled, the plunger solenoid 36 no longer motivates the plunger 26 downwardly and the plunger spring 24 may then contract to pull the plunger upwardly, extending the slide gate spring 39 and raising the slide gate shutoff 38. Braking fluid is drawn out of the brake lines 50 and back into the solenoid housing 34 thereby releasing the vehicle's brakes.

The instant invention may be fabricated as a kit having modularized components which are attached easily to the user's vehicle. A modularized sensing means may be mounted on the rear of the vehicle, having wire connections to the power source and to the vehicle's transmission reverse switch. Similarly, a modularized pair of plungers may be provided for mounting within the braking fluid reservoir or in place thereof having necessary electrical connections for its solenoids.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A vehicle back-up safety device connected to an electrical power source for automatically activating the hydraulic brakes of a vehicle upon detection of an obstruction within a prescribed area behind the vehicle, the vehicle having a brake master cylinder containing a braking fluid and being in fluid communication with the vehicle's brake lines, comprising:

(1) a sensing system for sensing the presence of said obstruction, said sensing system being electrically connected to said electrical power source and comprising a transmitter for generating and transmitting an object detection signal and a receiver for receiving a reflection of said object detection signal and for generating and transmitting an activating signal;

(2) two electrically-motivated plunger assemblies in fluid communication with said brake master cylinder and said brake lines, each of said plunger assemblies comprising:
  (a) a plunger having an upper end attached to an extensible plunger spring and a lower end;
  (b) a plunger solenoid electrically connectable to said power source;
  (c) a hollow solenoid housing having a fluid inlet at its lower end for providing fluid communication with the brake master cylinder and having a fluid outlet at its upper end for providing fluid communication with said brake lines;
  (d) a solenoid plunger cap; and
  (e) a slide gate shutoff configured to engage the lower end of said plunger;

(3) a control means connected to said electrical power source and responsive to said activating signal from said receiver, said control means being configured for switching an electronic gate in response to said activating signal to provide electrical power to and to activate said plunger assembly.

2. The vehicle back-up safety device in accordance with claim 1, wherein said vehicle further comprises a standard reverse switch and wherein said sensing device in connected to said power source by means of an electronic switch.

3. The vehicle back-up safety device in accordance with claim 2, wherein said electronic switch is wired in parallel with said reverse switch such that said sensing device is automatically engaged whenever the vehicle is engaged in reverse gear.

4. The vehicle back-up safety device in accordance with claim 1, wherein said sensing device is connected in parallel with said reverse switch.

5. The vehicle back-up safety device in accordance with claim 1, wherein said electrical power source is derived from the vehicle's main electrical system or from a separate battery.

6. The vehicle back-up safety device in accordance with claim 1, wherein said sensing device is selected from the group consisting of infrared, laser and ultrasonic sensing devices.

7. The vehicle back-up safety device in accordance with claim 1, wherein said activated signal is amplified.

8. The vehicle back-up safety device in accordance with claim 1, wherein said plunger assembly further comprises a compressible slide gate spring disposed within said slide gate shutoff.

9. The vehicle back-up safety device in accordance with claim 1, wherein said plunger is configured with an upper flange at its upper end and a lower flange at its lower end, said lower flange extending into said slide gate shutoff and contacting the proximal end of said slide gate spring.

10. The vehicle back-up safety device in accordance with claim 9, wherein said activation of said plunger assembly motivates said plunger downwardly whereby said lower flange exerts a pressure on said compressible spring thereby motivating said slide gate shutoff to obstruct said fluid inlet, and whereby said lower end of said plunger forces a brake line fluid into said brake line through said fluid outlet to activate the vehicle's hydraulic brakes.

11. A vehicle back-up safety device connected to an electrical power source for automatically activating the hydraulic brakes of a vehicle upon detection of an obstruction within a prescribed area behind the vehicle, the vehicle having a brake master cylinder containing a braking fluid and being in fluid communication with the vehicle's brake lines, comprising:

(1) a sensing system for sensing the presence of said obstruction, said sensing system being electrically connected to said electrical power source and comprising a transmitter for generating and transmitting an object detection signal and a receiver for receiving a reflection of said object detection signal and for generating and transmitting an activating signal;

(2) two electrically-motivated plunger assemblies in fluid communication with said brake master cylinder and said brake lines, each of said plunger assemblies comprising:

(a) a plunger having an upper end attached to an extensible plunger spring and a lower end, said upper end having an upper flange and said lower end having a lower flange;

(b) a plunger solenoid electrically connectable to said power source;

(c) a hollow solenoid housing having a fluid inlet at its lower end for providing fluid communication with the brake master cylinder and having a fluid outlet at its upper end for providing fluid communication with said brake lines;

(d) a solenoid plunger cap; and (e) a slide gate shutoff having a compressible slide gate spring disposed therein, said lower flange of said plunger extending into said slide gate shutoff and contacting said proximal end of said slide gate spring;

(3) a control means connected to said electrical power source and responsive to said activating signal from said receiver, said control means being configured for switching an electronic gate in response to said activating signal to provide electrical power to and to activate said plunger assembly.

12. The vehicle back-up safety device in accordance with claim 11, wherein said vehicle further comprises a standard reverse switch and wherein said sensing device in connected to said power source by means of an electronic switch.

13. The vehicle back-up safety device in accordance with claim 12, wherein said electronic switch is wired in parallel with said reverse switch such that said sensing device is automatically engaged whenever the vehicle is engaged in reverse gear.

14. The vehicle back-up safety device in accordance with claim 11, wherein said sensing device is connected in parallel with said reverse switch.

15. The vehicle back-up safety device in accordance with claim 11, wherein said electrical power source is derived from the vehicle's main electrical system or from a separate battery.

16. The vehicle back-up safety device in accordance with claim 11, wherein said sensing device is selected from the group consisting of infrared, laser and ultrasonic sensing devices.

17. The vehicle back-up safety device in accordance with claim 11, wherein said activated signal is amplified.

18. The vehicle back-up safety device in accordance with claim 1, further comprising an override mechanism.

19. The vehicle back-up safety device in accordance with claim 11, further comprising an override mechanism.

* * * * *